US009922019B2

(12) United States Patent
Bauchot

(10) Patent No.: US 9,922,019 B2
(45) Date of Patent: *Mar. 20, 2018

(54) PERSISTENTLY SELF-REPLICATING CELLS

(71) Applicant: Frederic Bauchot, Saint Jeannet (FR)

(72) Inventor: Frederic Bauchot, Saint Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 14/840,441

(22) Filed: Aug. 31, 2015

(65) Prior Publication Data
US 2015/0370775 A1    Dec. 24, 2015

Related U.S. Application Data

(63) Continuation of application No. 13/495,030, filed on Jun. 13, 2012, now Pat. No. 9,158,751, which is a
(Continued)

(30) Foreign Application Priority Data

Oct. 24, 2000 (EP) ......................... 480096

(51) Int. Cl.
G06F 15/00    (2006.01)
G06F 17/24    (2006.01)
(Continued)

(52) U.S. Cl.
CPC .......... G06F 17/246 (2013.01); G06F 3/0482 (2013.01); G06F 3/04842 (2013.01)

(58) Field of Classification Search
CPC .................................. G06F 17/246
See application file for complete search history.

(56) References Cited

U.S. PATENT DOCUMENTS 5,247,611 A    9/1993 Norden-Paul et al.
5,276,607 A    1/1994 Harris et al.
(Continued)

FOREIGN PATENT DOCUMENTS

EP    0358492 A2    3/1990
EP    1202185 A2    5/2002
(Continued)

OTHER PUBLICATIONS

Microsoft Press, Microsoft Mouse Programmer's Referencd, 1989, 326 pp.
(Continued)

Primary Examiner — Mohammed-Ibrahim Zuberi
(74) Attorney, Agent, or Firm — Patrick J. Daugherty; Driggs, Hogg, Daugherty & Del Zoppo Co., LPA

(57) ABSTRACT

The present invention includes a method and system for persistently self-replicating multiple ranges of cells through a copy-paste operation, in a multi-dimensional spreadsheet. A set of ranges of cells is defined, wherein each range of cells has the same size. Each time the content of a range of cells belonging to this set is changed, a self-replication operation is performed automatically. The self-replication operation includes the steps of copying the changed range of cells onto a buffer; determining the set of ranges of cells to which the changed range of cells belongs; identifying the ranges of cells belonging to the set; and pasting the content of the buffer in each of the identified range of cells belonging to the set.

19 Claims, 11 Drawing Sheets

Related U.S. Application Data continuation of application No. 12/240,163, filed on Sep. 29, 2008, now Pat. No. 8,250,461, which is a continuation of application No. 09/887,602, filed on Jun. 22, 2001, now Pat. No. 7,472,339.

(51) Int. Cl.
*G06F 3/0482* (2013.01)
*G06F 3/0484* (2013.01)

(56) References Cited

U.S. PATENT DOCUMENTS

| | | |
|---|---|---|
| 5,282,128 A | 1/1994 | Braude |
| 5,293,615 A | 3/1994 | Amada |
| 5,339,410 A | 8/1994 | Kanai |
| 5,359,729 A | 10/1994 | Yarnell et al. |
| 5,371,675 A | 12/1994 | Greif et al. |
| 5,418,902 A | 5/1995 | West et al. |
| 5,463,724 A | 10/1995 | Anderson et al. |
| 5,471,612 A | 11/1995 | Schlafly |
| 5,604,854 A | 2/1997 | Glassey |
| 5,742,835 A | 4/1998 | Kaethler |
| 5,819,293 A | 10/1998 | Comer et al. |
| 5,970,506 A | 10/1999 | Kiyan et al. |
| 6,112,214 A | 8/2000 | Graham et al. |
| 6,138,130 A | 10/2000 | Adler et al. |
| 6,157,934 A | 12/2000 | Khan et al. |
| 6,317,750 B1 | 11/2001 | Tortolani et al. |
| 6,317,758 B1 | 11/2001 | Madsen et al. |
| 6,345,284 B1 | 2/2002 | Dinkelacker |
| 6,415,305 B1 | 7/2002 | Agrawal et al. |
| 6,549,878 B1 | 4/2003 | Lowry et al. |
| 6,579,324 B1 | 6/2003 | Lowry et al. |
| 6,610,102 B1 | 8/2003 | Aldred et al. |
| 6,631,497 B1 | 10/2003 | Jamshidi et al. |
| 6,651,216 B1 | 11/2003 | Sullivan et al. |
| 6,687,875 B1 | 2/2004 | Suzuki |
| 6,691,281 B1 | 2/2004 | Sorge et al. |
| 6,725,422 B1 | 4/2004 | Bauchot et al. |
| 6,912,690 B2 | 6/2005 | Bauchot |
| 7,472,339 B2 | 12/2008 | Bauchot |
| 2002/0007380 A1 | 1/2002 | Bauchot et al. |
| 2002/0049784 A1 | 4/2002 | Bauchot |
| 2002/0065848 A1 | 5/2002 | Walker et al. |
| 2002/0080179 A1 | 6/2002 | Okabe et al. |
| 2002/0080191 A1 | 6/2002 | Savoie |
| 2002/0091728 A1 | 7/2002 | Kjaer et al. |
| 2002/0116348 A1 | 8/2002 | Phillips et al. |
| 2002/0138653 A1 | 9/2002 | Ogura |
| 2003/0097381 A1 | 5/2003 | Detweiler et al. |
| 2009/0037803 A1 | 2/2009 | Bauchot |

FOREIGN PATENT DOCUMENTS

| | | |
|---|---|---|
| JP | 60-167059 | 8/1985 |
| JP | 08-16557 | 1/1996 |

OTHER PUBLICATIONS

Charles Petzold, Programming Windows, Second Edition, Microsoft Press, 1990, pp. 538-944.
Borland International, Inc., Quattro Pro for Windows, Getting Started, 1992, 101 pp.
Toman, The Amazing Data Connection, Journal of Accountancy, NY, May 1994, vol. 177, Issue 5, pp. 63-68.
Anonymous, Chart Noncontiguous Data in Quattro Pro, Inside Corel WordPerfect Suite, Louisville, Aug 2000, vol. 6, Issue 8, pp. 12-13.
Savage, Document that Spreadsheet!, Management Accounting Montvale, Nov. 1991, vol. 73, Issue 5, pp. 52-57.
Matthews, Excel for Windows 95, Fifth Edition, Osborne Mc-Graw-Hill, pp. 150-152, 208-209.
Boyce et al, Using Mircrosoft Office 97 Professional, Que Corporation, pp. 265-266, 268-269.
Halberg, Using Microsoft Excel 97, Que Corporation, pp. 118-122, 587.
Computimes Malaysia, Linking Spreadhseets with Excel, Jul. 12, 1999, p. 1.
Cox et al, Using Visual Programming to Extend the Power of Spreadsheet Computation, ACM 1994, pp. 153-161.
Anonymous, Linking Excel Data in Your Word Documents, Microsoft Word, Oct. 2000, vol. 7, p. 1, 4 pp.
Walkenbach, Visual Baler Promises Quick Spreadsheets, InfoWorld, Oct. 24, 1994, vol. 16, p. 101, 2 pp.
Akiko Makimura The Art of Application of Excel VBA Edition Utilizing Recorded Macros, "Combining Automatically Created Macros and Pasting Tables into a Document with a Single Touch", NikkeiPC21, vol. 5, No. 11, Jun. 1, 2000, translation—pp. 1-5.
Keiichi Kuriyama, Programming Reference Excel 2000 VBA, AI Publishing Corp., Aug. 20, 2000, translation—pp. 78-88.
N. Kanai et al. "An Expert System to Assist Production Planning", International Workshop on Artificial Intelligence for Industrial Applications, May 25, 1998 pp. 219-224.
R. W. Djang et al. "Similarity Inheritance: A New Model of Inheritance for spreadsheet VPLs" Visual Languages, 1998. Proceedings. 1998 IEEE Symposium on Halifax, NS, Canada, Sep. 1-4, 1998, Los Alamitos, CA IEEE Computer Soc., US Sep. 1, 1998 pp. 134-141.
K.W. Piersol, Object Oriented Spreadsheets: "The Analytic Spreadsheet Package" Oopsla, Object-Oriented Programming Systems, Language and Applications Conference Proceedings, Sep. 29-Oct. 2, 1986, Portland, Oregon, pp. 385-390.
"Getting Results with Microsoft Office 97", Microsoft Press, 1997, pp. 169-181.
Barnes, "10 Minute Guide to Windows 3.1" Alpha, 1992, pp. 60-64.
U.S. Appl. No. 13/495,030, filed Jun. 13, 2012; Confirmation No. 1014.
Notice of Allowance (dated Jun. 5, 2015) for U.S. Appl. No. 13/495,030, filed Jun. 13, 2012; Confirmation No. 1014.

FIG. 3A

|   | A | B | C | D | E | F | G | H | I | J | K |
|---|---|---|---|---|---|---|---|---|---|---|---|
| 1 | ABC Corporation - Invoice template | | | | | | | | | | |
| 2 | | | | | | | | Profit | | 50% | |
| 3 | | | | | | | | | | | |
| 4 | Reference | Unit Cost | Quantity | | Currency | Exchange Rate | | Price | | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

FIG. 3B

|   | A | B | C | D | E | F | G | H | I | J | K |
|---|---|---|---|---|---|---|---|---|---|---|---|
| 1 | ABC Corporation - Invoice template | | | | | | | | | | |
| 2 | | | | | | | | | | | |
| 3 | | | | | | | | | | | |
| 4 | Reference | Unit Cost | Quantity | | Currency | Exchange Rate | | Profit | Price | | |
| 5 | | | | | | | | | | | |
| 6 | | | | | | | | | | | |
| 7 | | | | | | | | | | | |
| 8 | | | | | | | | | | | |
| 9 | | | | | | | | | | | |
| 10 | | | | | | | | | | | |
| 11 | | | | | | | | | | | |
| 12 | | | | | | | | | | | |
| 13 | | | | | | | | | | | |
| 14 | | | | | | | | | | | |
| 15 | | | | | | | | | | | |
| 16 | | | | | | | | | | | |

| PSRS Name | PSRR Address | PSRR Pattern | Set Index | Range Index |
|---|---|---|---|---|
|  |  |  |  |  |
|  |  |  |  |  |
|  |  |  |  |  |

410
402  403  404  405  406
401

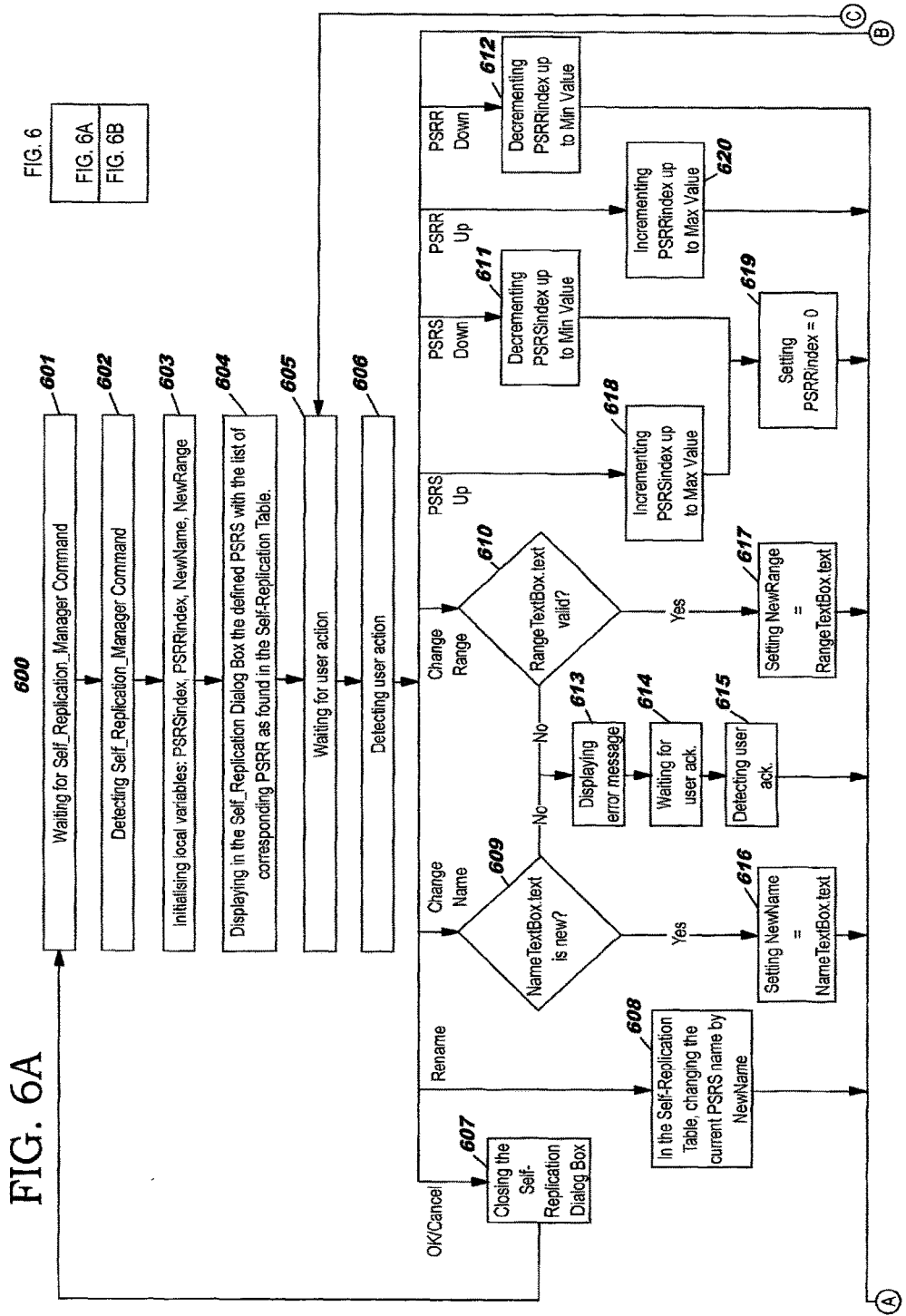

PERSISTENTLY SELF-REPLICATING CELLS

FIELD OF THE INVENTION

The present invention relates to the field of information processing by digital computers, and more particularly to a method and system, in an electronic spreadsheet, for persistently self-replicating multiple ranges of cells through a copy-paste operation.

BACKGROUND

Before computers, numerical analyses, particularly financial ones, were usually prepared on an accountant's columnar pad or spreadsheet, with pencil and calculator in hand. By organizing data into columns and rows, spreadsheets afford the rapid assimilation of information by a reader. The task of preparing a spreadsheet on paper, however, is laborious. The process tends to be very slow, as each entry must be tediously calculated and entered into the spreadsheet. Since all calculations are the responsibility of the preparer, manually prepared spreadsheets are also prone to errors. Hence, preparation of spreadsheets by hand is slow, tedious, and unreliable.

With the advent of microcomputers, a solution was forthcoming in the form of "electronic spreadsheets." Better known simply as "spreadsheets," these software programs provide a computerized replacement for the traditional financial modeling tools: the accountant's columnar pad, pencil, and calculator. In some regards, spreadsheet programs are to those tools what word processors are to typewriters. Spreadsheets offer dramatic improvements in ease of creating, editing, and using financial models.

A typical spreadsheet program configures the memory of a computer to resemble the column/row or grid format of an accountant's columnar pad, thus providing a visible calculator for a user. Because this "pad" exists dynamically in the computer's memory, however, it differs from paper pads in several important ways. Locations in the electronic spreadsheet, for example, must be communicated to the computer in a format which it can understand. A common scheme for accomplishing this is to assign a number to each row in a spreadsheet, a letter to each column, and another letter to each sheet (or page) of the spreadsheet. To reference a location at column A and row 1 of the second page (i.e., the upper-left hand corner), for example, the user types in "B:A1". In this manner, the spreadsheet defines an addressable storage location or "cell" at each intersection of a row with a column within a given page.

Data entry into an electronic spreadsheet occurs in much the same manner that information would be entered on an accountant's pad. After a screen cursor is positioned at a desired location, the user can enter alphanumeric information. Besides holding text and numeric information, however, spreadsheet cells can store special instructions or "formulas" specifying calculations to be performed on the numbers stored in spreadsheet cells. Such spreadsheet cells can also be defined and named as a range as long as they are arranged as a contiguous set of cells. A typical example of such a named range simply corresponds to a regular table found in an accountant's pad. In this fashion, range names can serve as variables in an equation, thereby allowing precise mathematical relationships to be defined between cells. The structure and operation of a spreadsheet program, including advanced functions such as functions and macros, are documented in the technical, trade, and patent literature.

Electronic spreadsheets offer many advantages over their paper counterparts. For one, electronic spreadsheets are much larger (i.e., hold more information) than their paper counterparts; electronic spreadsheets having thousands or even millions of cells are not uncommon. Spreadsheet programs also allow users to perform "what-if" scenarios. After a set of computational relationships has been entered into a worksheet, thanks to imbedded formulas for instance, the spread of information can be recalculated using different sets of assumptions, with the results of each recalculation appearing almost instantaneously. Performing this operation manually, with paper and pencil, would require recalculating every relationship in the model with each change made. Thus, electronic spreadsheet systems were invented to solve "what-if" problems, that is, changing an input and seeing what happens to an output.

Cell ranges are used to automate the computations in a spreadsheet. Whether cells or cell ranges are named or not, they can be referenced within a formula either by a "relative" or an "absolute" reference. Such a reference can be the address of the referenced cell range, or the name of the referenced cell range if it turns that this cell range is named.

It is common to find in electronic spreadsheet based applications some large tables which are organized according to a structured way. This structure typically results in organizing rows, columns and sheets in such a way that the content of each of the cells within a given column and within a given sheet can be obtained as the result of a copy-paste operation where the source copied cell is any cell within this same column and same sheet. In such typical situations, this source cell can contain a formula referencing in a relative or absolute way one or several other cells, so that each of the other cells within the same column of the same sheet will also contain the same formula where the absolute references will be kept unchanged and where the relative references will point to other relative cells.

Such a typical situation is illustrated in FIG. 3A where a table is used to compute a sales item price according to some input data. In this table, the content of the cell with address C6 (column entitled "Unit Cost") is for instance equal to the formula "@CostOf(B6)" where @CostOf is a dedicated function providing the cost of an item passed as parameter. In the same table, the content of the cell with address G6 (column entitled "Exchange rate") is for instance equal to the formula "@RateOf(F6)" where @RateOf is a dedicated function returning the exchange rate for a currency passed as parameter. In the same table, the content of the cell with address I6 (column entitled "Price") is for instance equal to the formula "C6*D6*G6/(1−$PROFIT)" where "PROFIT" is the name given to the cell range with address I3 where the profit figure is recorded. The content of each cell within the "Unit Cost" table can be obtained by copy-pasting the cell with address C6, so that the content of the cell with address Cx (where x takes the values 7 to 10) is found equal to "@CostOf(Bx)". In this way, each of the cells with address C6 to C10 is virtually a "replicate" of all the other cells with address C6 to C10 through a copy-paste operation, meaning that any cell within this set can be derived from any other one within the same set through a copy-paste operation. Similarly, the content of the cells with address Gx and with address Ix are obtained by copy-pasting the content of the cells with address G6 and with address I6, respectively. The content is equal to "@RateOf(Fx)" and to "Cx*Dx*Gx/(1−$PROFIT)" respectively. Thus, the cells with address G6 to G10 and the cells with address I6 to I10 are virtually "self-replicating" through a copy-paste operation. The copy-paste operation is thus a powerful tool for applying in many different cells, or ranges of cells, the content of a given cell or of a given range of cells. Nevertheless this copy-paste operation presents some limitations, as outlined hereafter.

Assume that in our example the content of the cells within a table column needs to be updated to reflect some structural change of the table to which it belongs. Such a structural change is illustrated in FIG. 3B where the profit parameter (used to derive a price from a cost) is no longer constant for all sold items (as shown in FIG. 3A with the cell of address I3, and named "PROFIT"), but depends on the sold item itself, as represented in the table by the cells within the column entitled "Profit". Under this new rule, the content of the cell with address I6 (within the column entitled "Price") is now equal to the formula "C6*D6*G6/(1−H6)". In order to reflect this table structural update in the other cells of the same "Price" column, it is necessary to reapply the copy-paste operation from the top column cell to all the other column cells following the same logic, that is the cells with address I7 to I10 as shown in FIG. 3B. More generally, this operation must be carefully done each time a given range of cells content is updated and must be applied to all the other ranges of cells which have been initially self replicated with this given range of cells through a copy-paste operation.

With large and complex spreadsheets, such a task may take quite a long time and be error prone, because the spreadsheet user may miss some of the ranges of cells where the copy-paste operation must be reapplied. When this happens, the resulting spreadsheet provides erroneous results. The present invention offer a powerful and efficient solution to this problem by defining a method and a system for persistently self-replicating multiple ranges of cells through a copy-paste operation.

SUMMARY OF THE INVENTION

The present invention relates to the field of information processing by digital computers, and more particularly to methods and systems for persistently self-replicating multiple ranges of cells through a copy-paste operation, in a multi-dimensional spreadsheet. The method includes defining a set of ranges of cells, each range of cells having the same size, and each time the content of a range of cells belonging to this set is changed, automatically performing a self-replication operation. The self-replication operation includes: copying the changed range of cells onto a buffer; determining the set of ranges of cells to which the changed range of cells belongs identifying the ranges of cells belonging to the set; and pasting the content of the buffer in each identified range of cells belonging to the set.

BRIEF DESCRIPTION OF THE DRAWINGS

The invention will best be understood by reference to the following detailed description when read in conjunction with the accompanying drawings, wherein:

FIGS. 3A and 3B illustrate a typical spreadsheet structure used in one embodiment of the present invention.

FIG. 4 illustrates the structure of the persistent self-replication table, according to one embodiment of the present invention.

FIGS. 6A, 6B are a flow chart illustrating a method for managing objects involved in Persistent Self-Replication operations, according to the present invention.

DETAILED DESCRIPTION

System Hardware

Figure 1A:
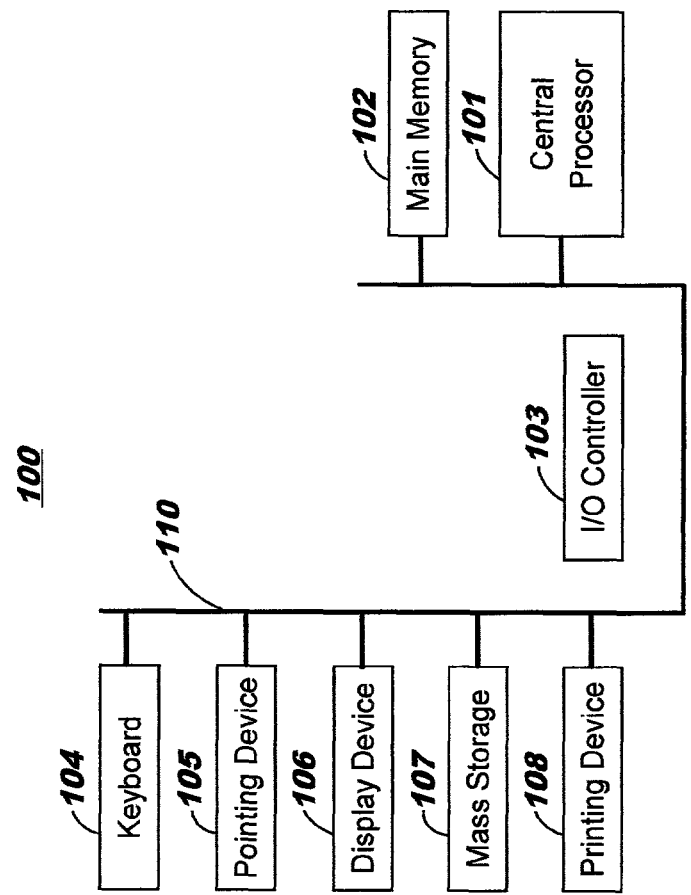
FIG. 1A is a schematic view of a computer system in which the present invention may be embodied.

As shown in FIG. 1A, the present invention may be embodied on a computer system 100 comprising a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be included in the system 100 as desired. As illustrated, the various components of the system 100 communicate through a system bus 110 or similar architecture. In one embodiment, the computer system 100 includes an IBM-compatible personal computer, which is available from several vendors (including International Business Machine—IBM Corporation of Armonk, N.Y.).

Figure 1B:
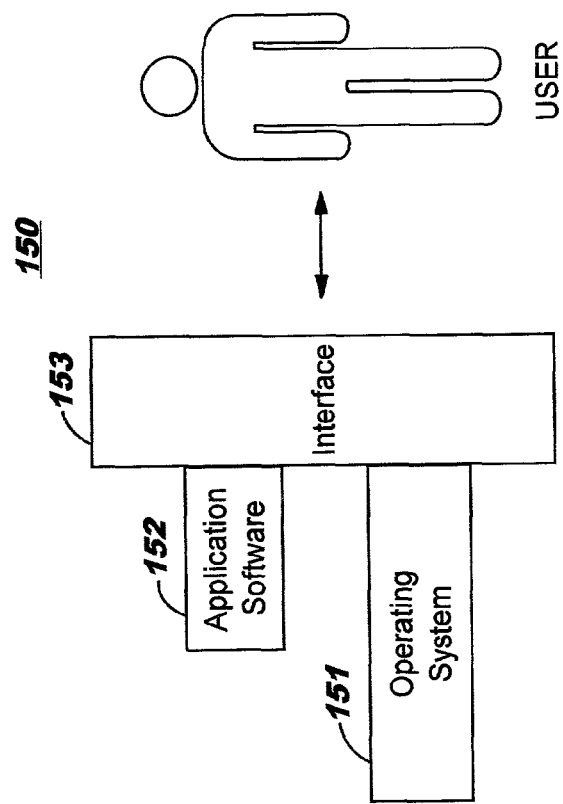
FIG. 1B is a schematic view a software system including an operating system, software application, and a user interface for carrying out the present invention.

Illustrated in FIG. 1B, a computer software system 150 is provided for directing the operation of the computer system 100. Software system 150, which is stored in system memory 102 and on disk memory 107, includes a kernel or operating system 151 and a shell or interface 153. One or more application programs, such as application software 152, may be "loaded' (i.e., transferred from storage 107 into memory 102) for execution by the system 100. The system 100 receives user commands and data through user interface 153; these inputs may then be acted upon by the system 100 in accordance with instructions from operating system 151 and/or application software 152. The interface 153, which is preferably a graphical user interface (GUI), also serves to display results, whereupon the user may supply additional inputs or terminate the session. In one embodiment, operating system 151 and interface 153 are Microsoft Win95, available from Microsoft Corporation of Redmond, Wash. Application software 152, on the other hand, includes a spreadsheet notebook of the present invention as described in further detail herein below.

Interface

The following description will focus on embodiments of the present invention that include spreadsheet applications operative in the Microsoft Win95 environment. The present invention, however, is not limited to any particular application or any particular environment. Instead, those skilled in the art will find that the system and methods of the present invention may be advantageously applied to a variety of system and application software, including database management systems, word processors, and the like. Moreover, the present invention may be embodied on a variety of different platforms, including Macintosh, UNIX, NextStep, and the like. Therefore, the descriptions of the exemplary embodiments which follow are for purposes of illustration and not limitation.

Figure 1C:
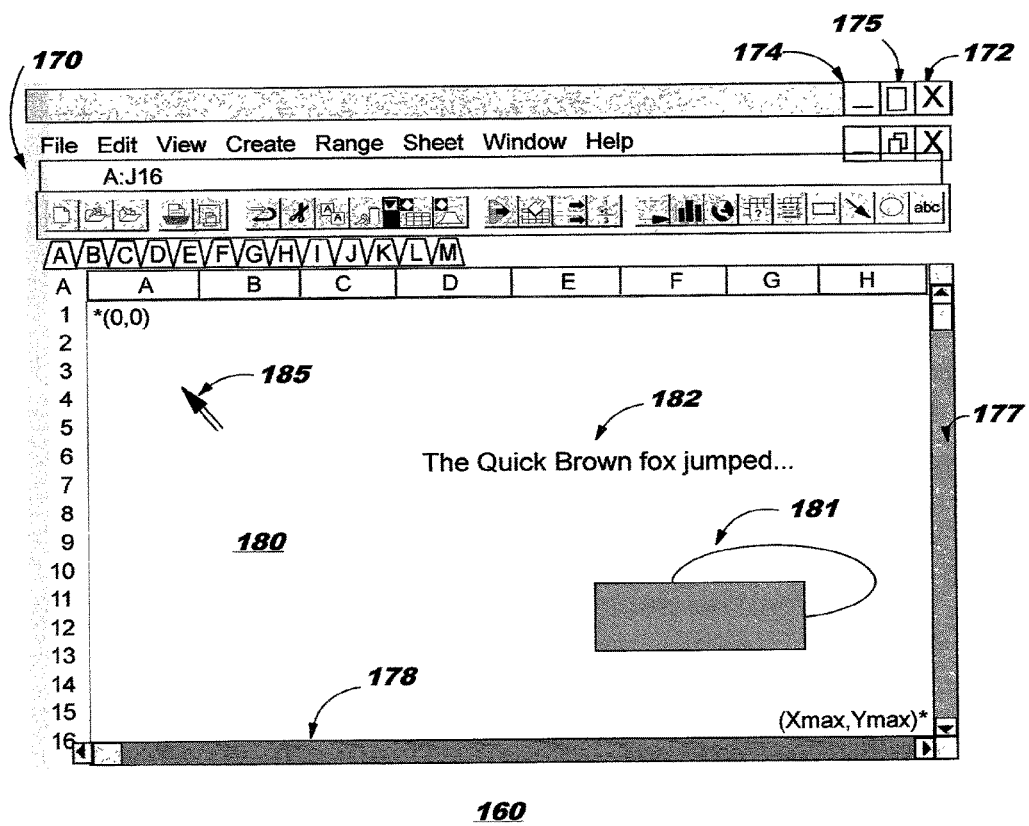
FIG. 1C illustrates the basic architecture and functionality of a graphical user interface in which the present invention may be embodied.

Referring now to FIG. 1C, the system 100 includes a workspace or window 160. Window 160 is a rectangular, graphical user interface (GUI) for display on screen 106; additional windows may be displayed in various sizes and formats (e.g., tiled or cascaded), as desired. At the top of window 160 is a menu bar 170 with a plurality of user-command choices, each of which may invoke additional submenus and software tools for use with application objects. Window 160 includes a client area 180 for displaying and manipulating screen objects, such as graphic object 181 and text object 182. In essence, the client area is a workspace or viewport for the user to interact with data objects which reside within the computer system 100.

Window 160 includes a screen cursor or pointer 185 for selecting and otherwise invoking screen objects of interest. In response to user movement signals from the pointing device 105, the cursor 185 floats (i.e., freely moves) across the screen 106 to a desired screen location. During or after cursor movement, the user may generate user-event signals (e.g., mouse button "clicks" and "drags") for selecting and manipulating objects, as is known in the art. For example, window 160 may be closed, re-sized, or scrolled by "clicking" (selecting) screen components 172, 174/5, and 177/8, respectively.

In one embodiment, screen cursor 185 is controlled with a mouse device. Single-button, double-button, or triple-button mouse devices are available from a variety of vendors, including Apple Computer of Cupertino, Calif., Microsoft Corporation of Redmond, Wash., and Logitech Corporation of Fremont, Calif., respectively. More preferably, screen cursor control device 105 is a two-button mouse device, including both right and left "mouse buttons."

Programming techniques and operations for mouse devices are well documented in the programming and hardware literature; see e.g., Microsoft Mouse Programmer's Reference, Microsoft Press, 1989. The general construction and operation of a GUI event-driven system, such as Microsoft Windows, is also known in the art: see, e.g., Petzold, C., Programming Windows, Second Edition, Microsoft Press, 1990. The disclosures of each are hereby incorporated by reference.

Figure 2A:
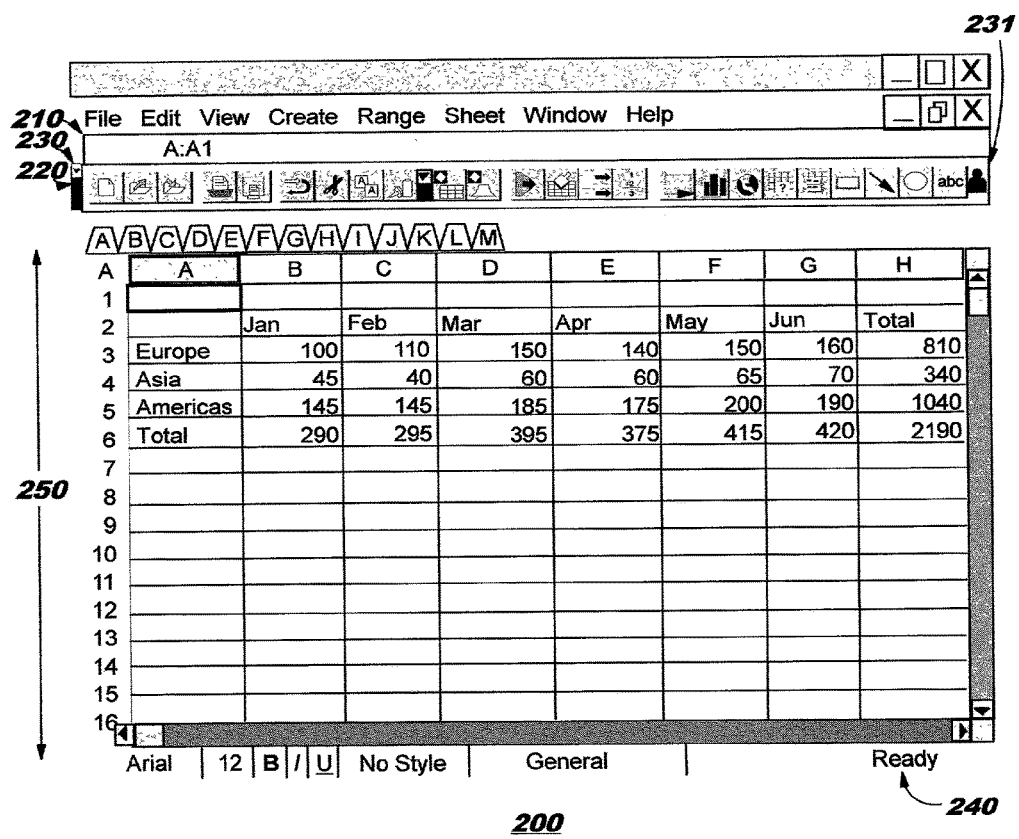
FIG. 2A shows a spreadsheet notebook interface according to one embodiment of the present invention.

Interface Embodiment:

A spreadsheet notebook interface of the present invention will now be described. As shown in FIG. 2A, the spreadsheet notebook or workbook of the present invention includes a notebook workspace 200 for receiving, processing, and presenting information, including alphanumeric as well as graphic information. Notebook workspace 200 includes a menu bar 210, a toolbar 220, a current cell indicator 230, an input line 231, a status line 240, and a notebook window 250. The menu bar 210 displays and invokes, in response to user inputs, a main level of user commands. Menu 210 also invokes additional pull down menus, as is known in windowing applications. Input line 231 accepts user commands and information for the entry and editing of cell contents, which may include data, formulas, macros, and the like. Indicator 230 displays an address for the current cursor (i.e., active cell) position, or the address or name of a selected named range (i.e. active selection). At the status line 240, system 100 displays information about the current state of the workbook; for example, a "READY" indicator means that the system is ready for the user to select another task to be performed.

Figure 2B:
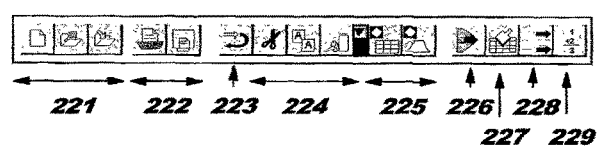
FIG. 2B shows the toolbar component of the notebook interface shown in FIG. 2A.

The toolbar 220, shown in further detail in FIG. 2B, comprises a row or palette of tools which provide a quick way for the user to choose commonly-used menu commands or properties. In an exemplary embodiment, toolbar 220 includes file manipulation buttons 221, printing buttons 222, an undo button 223, cut, copy, and paste buttons 224, information pop-up window buttons tool 225, a named range selection button 226, a style copy button 227, a column re-sizing button 228, and a sum button 229. The functions of these buttons are suggested by their names. For instance, buttons 224 cut, copy and paste data and objects to and from Windows' clipboard. The same actions are also available as corresponding commands in the Edit menu (available from menu bar 210).

The notebook, which provides an interface for entering and displaying information of interest, includes a plurality of spreadsheet pages. Each page may include conventional windowing features and operations, such as moving, re-sizing, and deleting. In one embodiment, the notebook includes 256 spreadsheet pages, all of which are saved as a single disk file on the mass storage 107. Workspace 200 may display one or more notebooks, each sized and positioned (e.g., tiled, overlapping, and the like) according to user-specified constraints.

Each spreadsheet page of a notebook includes a two-dimensional spread. Page A from the notebook 200, for example, includes a grid in row and column format, such as row 3 and column F. At each row/column intersection, a box or cell (e.g., cell C4) is provided for entering, processing, and displaying information in a conventional manner. Each cell is addressable, with a selector being provided for indicating a currently active cell (i.e., the cell that is currently selected).

Figure 2C:
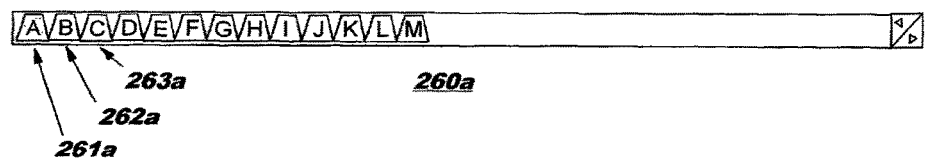
FIGS. 2C and 2D show page identifiers for rapidly accessing and manipulating individual pages of the notebook interface shown in FIG. 2A.
Figure 2D:
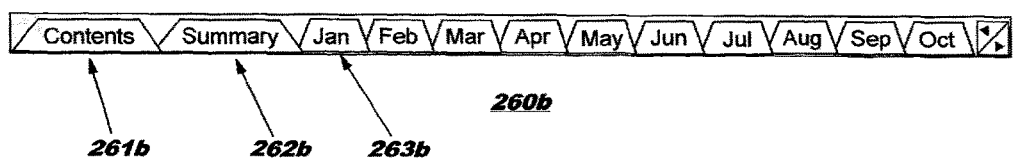

As shown in FIGS. 2C-D, individual notebook pages are identified by page identifiers 260, preferably located along one edge of a notebook. In one embodiment, each page identifier is in the form of a tab member (e.g., members 261a, 262a, 263a) situated along a top edge of the notebook. Each tab member may include representative indicia, such as textual or graphic labels, including user selected titles representing the contents of a corresponding page. In FIG. 2C, the tab members 260 are set to their respective default names. For example, the first three tab members (members 261a, 262a, 263a) are respectively set to A, B, and C. Tab members are typically given descriptive names provided by the user, however. As shown in FIG. 2D, for example, the first three tab members have now been set to "Contents" (tab member 261b), "Summary" (tab member 262b), and "Jan" (tab member 263b). In a similar manner, the remaining tabs are set to subsequent months of the year. In this manner, the user associates the page identifiers with familiar tabs from an ordinary paper notebook. Thus, the user already knows how to select a page or spread of interest: simply select the tab corresponding to the page (as one would do when selecting a page from a paper notebook).

In addition to aiding in the selection of an appropriate page of information, the user-customizable page identifiers serve to aid in the entry of spreadsheet named range addresses. For example, when entering a formula referring to a named range of cells on another page, the user may simply use the descriptive page name in the named range address, thus making it easier for the user to understand the relationship of the cell(s) or information being referenced.

A general description of the features and operation of the spreadsheet notebook interface may be found in Quattro Pro for Windows (Getting Started, User's Guide and Building Spreadsheet Applications), available from Borland International.

Persistent Self-Replicating Operation

As the power of spreadsheet environments has increased over the last several years, it is possible today to develop complex custom applications based solely on spreadsheets, as opposed to applications developed with general purpose programming languages like C++ or VisualBasic from Microsoft Corporation. This can be achieved using spreadsheet imbedded tools such as macro languages, script languages, and formulas. In large spreadsheets, it is common to find structured tables where the content of some cells are directly derived from the contents of other cells using formulas which translate the relationship between these cells.

Such formulas can be quite complex, consequently it is advantageous to copy-paste such a formula, once established, from a given cell onto all the other cells where the same relationship exists. If this relationship evolves during the life of a spreadsheet, however, then the spreadsheet user must first update a first cell content (typically rewriting the formula it holds), and then the spreadsheet user must again perform a copy-paste operation between this first cell and all the cells whose content was previously obtained from the reference cell content with a copy-paste operation. In addition to the time spent by the user in performing this operation, there is a risk of applying this new copy-paste operation to the wrong set of cells: either some cells that need to be copy-pasted again may be missed, or some cells may be copy-pasted that should not be. In both cases, the resulting spreadsheet has been incorrectly updated, so that it provides erroneous results.

The present invention offers a user-friendly solution to this problem by defining a method and system that enables persistent self-replication of multiple ranges of cells through a copy-paste operation.

Self-Replication Manager Embodiment.

In contrast to the conventional tools just-described, the present invention provides a more powerful, user-friendly and interactive approach for persistently self-replicating multiple ranges of cells through a copy-paste operation using a Self-Replication manager.

The manager automatically allows the spreadsheet user to: create or rename or delete a set of persistently self-replicating ranges of cells, or add or suppress a given range of cells to or from a set of persistently self-replicating ranges of cells, and self-replicate any content update from a given range of cells belonging to a set of persistently self-replicating ranges of cells to all the other ranges of cells belonging to the same set of persistently self-replicating ranges of cells.

For descriptive clarity, a persistently self-replicating range of cells which can take advantage of the present invention will be called "persistently self-replicating range" or "PSRR", and a set of PSRR will be called "persistently self-replicating set" or "PSRS"

Persistently Self-Replicating Range and Persistently Self-Replicating Set

In one embodiment, PSRR can be easily identified on the display device 106 within the work area 180 of the window 160 by using some specific cell attributes, such as a font style or font color or background color or border line style or border line color or background pattern, etc. In one embodiment, the background pattern of a PSRR is set to a first pattern value referred to as PATTERN_PSRR. PSRS are uniquely identified by a logical identifier which can take multiple forms. In one embodiment of the present invention, PSRS are uniquely identified by a name corresponding to a character string of limited length.

Scenario

In one embodiment, the present invention may be used in two steps:

The first step occurs when the spreadsheet user decides, based on criteria not developed here, to take advantage of the present invention by using the self-replication manager for either creating, or deleting, or renaming a PSRS; or for either adding or removing a PSRR to/from a PSRS.

If so, the spreadsheet user can follow in sequence the following steps:

First the spreadsheet user optionally selects a range of cells by using conventional means such as (but not limited to) the pointing device 105 or the keyboard 104.

Figure 5A:
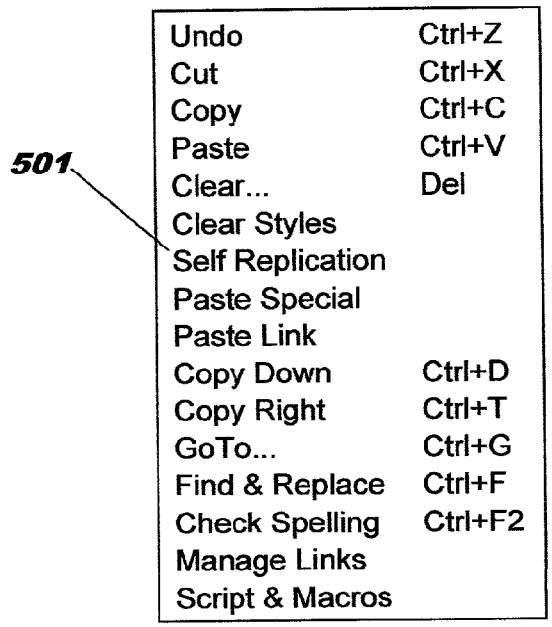
FIGS. 5A, 5B, illustrate a spreadsheet user interface for invoking the persistent self-replicating operation, according to the present invention.
Figure 5B:
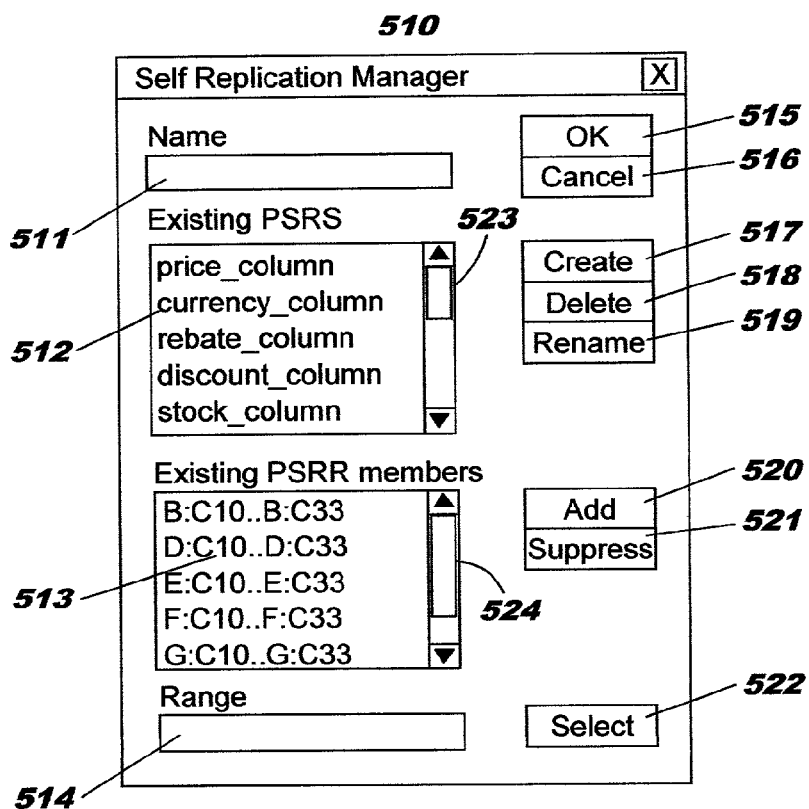

Then the spreadsheet user invokes an extension of the regular spreadsheet editing facilities using conventional means available in spreadsheet environment, such as (but not limited to) dedicated push-buttons, keyboard entry short cuts, menu or sub menu entries. This extension of the regular editing facilities corresponds to a specific command called "Self Replication_Manager". In one embodiment of the present invention, this Self_Replication_Manager command is invoked by clicking with the pointing device 105 on a menu entry 501 "Self Replication" within the conventional "Edit" menu 500 of an electronic spreadsheet, as shown in FIG. 5A. It results in displaying on the display device 106 a specific Self-Replication Dialog Box 510, as shown in FIG. 5B.

Then the spreadsheet user can take advantage of the different tools available within the Self-Replication Dialog Box 510, according to the following list:

The "Name" text box 511 and the "Create" push-button 517 can be used to create a new PSRS. For this purpose the spreadsheet user first fills this "Name text box 511 with the name of the new PSRS to be created and then clicks on the "Create" push-button 517. As a result, the newly created PSRS now appears within the "Existing PSRS" list box 512.

The "Existing PSRS" list box 512 and the "Delete" push-button 518 can be used to delete an existing PSRS. For this purpose, the spreadsheet user first selects within the "Existing PSRS" list box 512 the name of the PSRS to be deleted (if not visible within the "Existing PSRS" list box 512, the spreadsheet user can simply use the scroll bar 523 with the pointing device 105 to let the desired PSRS name appear within the "Existing PSRS" list box 512), and then clicks on the "Delete" push-button 518. As a result, the just deleted PSRS disappears from the "Existing PSRS" list box 512.

The "Name" text box 511, the "Existing PSRS" list box 512 and the "Rename" push-button 519 can be used to change the name of an existing PSRS. For this purpose, the spreadsheet user first selects within the "Existing PSRS" list box 512 the name of the PSRS to be renamed (if not visible within the "Existing PSRS" list box 512, the spreadsheet user can simply use the scroll bar 523 with the pointing device 105 to let the desired PSRS name appear within the "Existing PSRS" list box 512), then fills the "Name" text box 511 with the new name of the PSRS, and then clicks on the "Rename" push-button 518. As a result, the new name of the existing PSRS now appears within the "Existing PSRS" list box 512.

The "Existing PSRR members" list box 513 can be used to visualize all the PSRRS belonging to the PSRS currently selected within the "Existing PSRS" list box 512. To do this, the spreadsheet user first selects within the "Existing PSRS"

list box 512 the name of the PSRS to be visualized (if not visible within the "Existing PSRS" list box 512, the spreadsheet user can simply use the scroll bar 523 with the pointing device 105 to let the desired PSRS name appear within the "Existing PSRS" list box 512), and then clicks on the scroll bar 524 with the pointing device 105 to display in the "Existing PSRR members" list box 513 every PSRR belonging to the PSRS selected in the "Existing PSRS" list box 512.

The "Existing PSRR members" list box 513 and the "Suppress" push-button 521 can be used to remove a given PSRR from the PSRS currently selected within the "Existing PSRS" list box 512. To do this, the spreadsheet user first selects within the "Existing PSRS" list box 512 the name of the PSRS from which one member must be removed (if not visible within the "Existing PSRS" list box 512, the spreadsheet user can simply use the scroll bar 523 with the pointing device 105 to let the desired PSRS name appear within the "Existing PSRS" list box 512). The user then selects within the "Existing PSRR members" list box 513 the name of the PSRR to be removed (if not visible within the "Existing PSRR members" list box 513, the spreadsheet user can simply use the scroll bar 524 with the pointing device 105 to let the desired PSRR name appear within the "Existing PSRR members" list box 513), and then clicks on the "Suppress" push-button 521. As a result, the just deleted PSRR disappears from the "Existing PSRR" list box 513, and its background pattern is changed from the value PATTERN_PSRR to its original value (before it was turned as a PSRR).

The "Range" text box 514, the "Select" push-button 522 and the "Add" push-button 520 can be used to add a new PSRR to the PSRS currently selected within the "Existing PSRS" list box 512. To do this, the spreadsheet user first checks that the "Range" text box 514 holds the address of the range of cells to be added. By default, the "Range" text box 514 contains the address of the range of cells which was selected in the electronic spreadsheet just before invoking the Self_Replication_Manager command. The user can change this default range by clicking on the "Select" push-button 522 and then use the pointing device 105 to select the desired range of cells within the electronic spreadsheet. When the "Range" text box 514 holds the address of the right range of cells to be added, the user clicks on the "Add" push-button 520. As a result, the newly added PSRR now appears within the "Existing PSRR members" list box 513, and its background pattern is changed into a new pattern with value PATTERN_PSRR.

The "Cancel" push-button 516 and the "OK" push-button 515 can be used by the spreadsheet user to close the Self-Replication Dialog Box 510.

The second step occurs when the spreadsheet user updates a cell belonging to a PSRR which is itself a member of a PSRS:

If the spreadsheet user updates the content of a cell belonging to a PSRR, the self-replication manager invokes by itself a specific command called "Persistent_Self Replicate" which automatically reflects this update in all the other PSRR belonging to the same PSRS than the updated PSRR. This "Persistent_Self Replicate" operation is fully automated, without involvement of the spreadsheet user, and is itself based on a copy-paste operation applied by the self-replication manager between the updated PSRR and all the other PSRR belonging to the same PSRS.

Persistent Self-Replication Table

The decision to create, delete, or rename a PSRS, or to add or suppress a PSRR to or from a PSRS, belongs to the spreadsheet user. When such an operation occurs, a common repository, called the "Persistent Self-Replication Table", is used to record the data required by this operation. This Persistent Self-Replication Table is preferably saved on a nonvolatile memory (typically but not necessary as part of the spreadsheet disk file on the mass storage 107.

Referring now to FIG. 4, the Persistent Self-Replication Table 400 corresponds to a simple logical structure made of several records 401, each of which corresponds to a PSRR and includes five fields:

The "PSRS Name" 402 field is used for identifying uniquely the PSRS associated with the current record 401.

The "PSRR Address" 403 field is used for identifying uniquely the PSRR within the spreadsheet. For instance, the "PSRR Address" can correspond to the conventional address structure Sheet:RowColumn..Sheet:RowColumn associated with every range of cells (For example D:E10..D:G20 with D as Sheet name, E and G as Row name/number, 10 and 20 as Column name/number).

The "PSRR Pattern" field 404 records the background pattern of the PSRR, before being member of a PSRS.

The "Set Index" field 405 is used for navigating within the Self-Replication Table 400.

The "Range Index" field 406 is used for navigating within the Self-Replication Table 400.

The record 410 located at the beginning of the Persistent Self-Replication Table 400 is referred to as the top record.

In one embodiment, the Persistent Self-Replication Table 400 is explicitly included within the spreadsheet file itself, but other implementations can be used instead.

Methods

Self_Replication_Manager Method

Figure 6B:
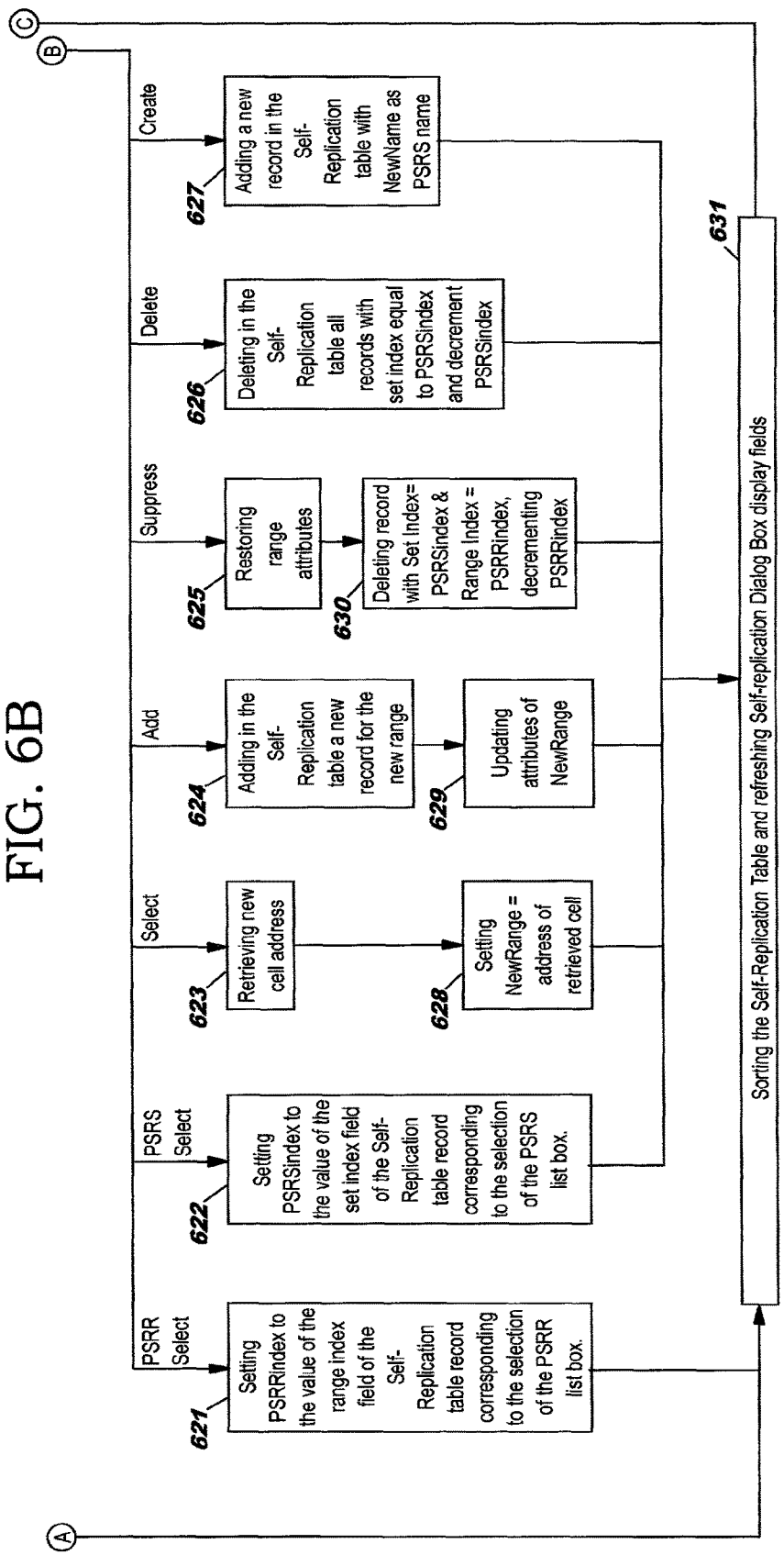

The method of handling user requests to take advantage of the present invention is detailed in flowchart 600 of FIGS. 6A, 6B. This method may be thought of as the processing of the Self_Replication_Manager command used for creating, or deleting, or renaming a PSRS, and for adding or suppressing a PSRR to or from a PSRS. The method comprises the following steps:

At step 601, the method is in its default state, waiting for an event to initiate the process.

At step 602, an event is detected, as a result of a user action. This action may be for instance, a specific combination of keys on the keyboard 104, or the click of the pointing device 105 on a specific button, or any other similar means not further specified here.

At step 603, local variables are initialized: the PSRSindex variable is set to the value 0, the PSRRindex variable is set to the value 0, the NewName variable is set to the value " " (empty string), and the NewRange variable is set to the character string representing the address of the electronic spreadsheet current selection.

At step 604, the Self-Replication Dialog Box 510 is displayed on the display device 106. The "Name" text box 511 is filled with the variable NewName. The "Existing PSRS" list box 512 is filled with the names found in the "PSRS Name" fields 402 of the various records 401 of the Self-Replicating Table 400. Within the "Existing PSRS" list box 512, the active item corresponds to the record 401 whose "Set Index" field 405 is equal to PSRSIndex. The "Existing PSRR members" list box 513 is filled with the addresses found in the "PSRR Address" fields 403 of the various records 401 of the Self-Replicating Table 400 for which the "Set Index" field 405 is equal to PSRSIndex. Within the "Existing PSRR members" list box 513, the active item corresponds to the record 401 whose "Range Index" field 406 is equal to PSRRIndex. The "Range" text box 514 is filled with the variable NewRange.

At step 605, the method is waiting for any user action on the Self-Replication Dialog Box 510. Such user action typically results from a click with the pointing device 105, but may be a specific combination of keys on the keyboard 104, or any other similar means not further specified here.

At step 606, a user action on the Self-Replication Dialog Box 510 is detected. If the user action is a change of the content of the "Name" text box 511, then control is given to step 609; if the user action is a selection with the pointing device 105 of an item within the "Existing PSRS" list box 512, then control is given to step 622; if the user action is a selection with the pointing device 105 of an item within the "Existing PSRR members" list box 513, then control is given to step 621; if the user action is a change of the content of the "Range" text box 514, then control is given to step 610; if the user action is a click on the push-button "OK" 515, then control is given to step 607; if the user action is a click on the push-button "Cancel" 516, then control is given to step 607; if the user action is a click on the push-button "Create" 517, then control is given to step 627; if the user action is a click on the push-button "Delete" 518, then control is given to step 626; if the user action is a click on the push-button "Rename" 519, then control is given to step 608; if the user action is a click on the push-button "Add" 520, then control is given to step 624; if the user action is a click on the push-button "Suppress" 521, then control is given to step 625; if the user action is a click on the push-button "Select" 522, then control is given to step 623; if the user action is a click on the up arrow of the scroll bar 523, then control is given to step 618; if the user action is a click on the down arrow of the scroll bar 523, then control is given to step 611; if the user action is a click on the up arrow of the scroll bar 524, then control is given to step 620; if the user action is a click on the down arrow of the scroll bar 524, then control is given to step 612.

At step 607, the Self-Replication Dialog Box 510 is closed, so that it disappears from the display device 106, and control is given back to the initial step 601 for treating any future Self_Replication_Manager command.

At step 608, in the Self-Replication Table 400, all the records 401 having a "Set Index" field 405 equal to PSRS-Index are updated by replacing their "PSRS name" field 402 by NewName. Then control is given to step 631.

At step 609, the character string specified by the spreadsheet user in the "Name" text box 511 is checked against all the already defined PSRS names, as recorded in the "PSRS Name" field 402 of all the records 401 of the Self-Replication Table 400. If the character string is new, i.e. it does not match any already defined name, then control is given to step 616; otherwise control is given to step 613.

At step 610, the character string specified by the spreadsheet user in the "Range" text box 514 is checked against a set of rules not detailed here to determine if it is or not a valid range address. Such rules are typically implementation-dependent and thus do not fall within the scope of the present invention. If the result of this checking is that this character string is found to be valid, then control is given to step 617, otherwise control is given to step 613.

At step 611, the variable PSRSIndex is decremented, unless the minimum value (equal to zero) has been reached. Then control is given to step 619.

At step 612, the variable PSRRIndex is decremented, unless the minimum value (equal to zero) has been reached. Then control is given to step 631.

At step 613, an error message notification is issued to warn the user that the character string checked at step 609 or 610 has not been found to be correct. This can typically be done by displaying on the display device 106 an error message in a pop-up window, but any other similar means could be used instead, without departing from the spirit of the present invention.

At step 614, the method is waiting for a user acknowledgement, meaning that the error message notification of step 613 has been received by the spreadsheet user.

At step 615, the user acknowledgement is detected. This may typically be a click, of the pointing device 105, on an "OK" push-button within the pop-up window that is typically displayed during the step 613, but other similar means can be used instead without departing from the spirit of the present invention. Then control is given to step 631.

At step 616, the value of the variable NewName is set equal to the character string within the "Name" text box 511. Then control is given to step 631.

At step 617, the value of the variable NewRange is set equal to the character string within the "Range" text box 514. Then control is given to step 631.

At step 618, the variable PSRSIndex is incremented, unless the maximum value (equal to the number of different values of the "PSRS Name" field 401) is already reached.

At step 619, the variable PSRRIndex is set equal to zero. Then control is given to step 631.

At step 620, the variable PSRRIndex is incremented, unless the maximum value (equal to the number of records 401 whose "Set Index" field 405 is equal to PSRSIndex) has been reached. Then control is given to step 631.

At step 621, the variable PSRRindex is set equal to the value of the "Range Index" field 406 of the record 401 of the Self-Replication table 400 corresponding to the user selection of the "Existing PSRR members" list box 513. Then control is given to step 631.

At step 622, the variable PSRSindex is set equal to the value of the "Set Index" field 405 of the record 401 of the Self-Replication table 400 corresponding to the user selection of the "Existing PSRS" list box 512. Then control is given to step 631.

At step 623, the method uses conventional means to let the user select a range within the spreadsheet. Such means may, for instance, rely on a pop-up window within which the user enters through the keyboard 104 the address of the range to select, or such means may rely on a pointing device 105 mode where the user clicks on the range to select, or such means may rely on other similar ways not further described here. Then control is given to step 628.

At step 624, a new record 401 is added to the Self-Replication table 400. The "PSRS Name" field 402 is set equal to the value of the "PSRS Name" field 402 of the record 401 whose "Set Index" field 405 is equal to PSRS-Index, the "PSRR Address" field 403 is set equal to the variable NewRange, the "PSRR pattern" field 404 is set equal to the value of the background pattern of the range with address NewRange, the "Set Index" field 405 is set equal to PSRSindex, the "Range Index" field 406 is set equal to the number of PSRR incremented by one. Then control is given to step 629.

At step 625, the background pattern of the range with address equal to the value of the "PSRR Address" field 403 of the record 401 whose "Set Index" field 405 is equal to PSRSIndex and whose "Range Index" field 406 is equal to PSRRIndex is set equal to the value of the "PSRR pattern" field 404 of the record 401 whose "Set Index" field 405 is equal to PSRSIndex and whose "Range Index" field 406 is equal to PSRRIndex. Then control is given to step 630. The Persistent_Self_Replicate method is no longer set as the routine handling the cell content modification event for the range of cells with address equal to the value of the "PSRR Address" field 403 of the record 401 whose "Set Index" field 405 is equal to PSRSIndex and whose "Range Index" field 406 is equal to PSRRIndex.

At step 626, all the records 401 of the Self-Replication table 400 are deleted if their "Set Index" field 405 is equal to PSRSIndex. Then the variable PSRSIndex is decremented, unless equal to zero. Then control is given to step 631.

At step 627, a new record 401 is added to the Self-Replication table 400. The "PSRS Name" field 402 is set equal to the variable NewName, the "PSRR Address" field 403 is left empty, the "PSRR pattern" field 404 is left empty, the "Set Index" field 405 is set equal to the number of PSRS incremented by one, and the "Range Index" field 406 is left empty. Then control is given to step 631.

At step 628, the variable NewRange is set equal to the address of the range retrieved at step 623. Then control is given to step 631.

At step 629, the background pattern of the range of cells with address equal to NewRange takes the value PATTERN_PSRR. The Persistent_Self_Replicate method is set as the routine handling the cell content modification event for the range of cells with address equal to NewRange. Then control is given to step 631.

At step 630, the record 401 in the Self-Replication table 400 with "Set Index" field 405 equal to PSRSindex and with "Range Index" field 406 equal to PSRRindex, is deleted. Then the variable PSRRIndex is decremented, unless equal to zero.

At step 631, the Self-Replication Table 400 is first rearranged and then sorted so that the set of values taken by the "Set Index" fields 405 is contiguous and so that the sets of values taken by the "Range Index" field 406 for a given value of the "Set Index" field 405 are contiguous. Then the Self-replication Dialog Box 510 display fields are refreshed. The "Name" text box 511 is filled with the variable NewName. The "Existing PSRS" list box 512 is filled with the names found in the "PSRS Name" fields 402 of the various records 401 of the Self-Replicating Table 400. Within the "Existing PSRS" list box 512, the active item corresponds to the record 401 whose "Set Index" field 405 is equal to PSRSIndex. The "Existing PSRR members" list box 513 is filled with the addresses found in the "PSRR Address" fields 403 of the various records 401 of the Self-Replicating Table 400 for which the "Set Index" field 405 is equal to PSRSIndex. Within the "Existing PSRR members" list box 513, the active item corresponds to the record 401 whose "Range Index" field 406 is equal to PSRRIndex. The "Range" text box 514 is filled with the variable NewRange. Then control is given back to step 605 for waiting for a new user action to treat.

F.2. Persistent_Self_Replicate Method

Figure 7:
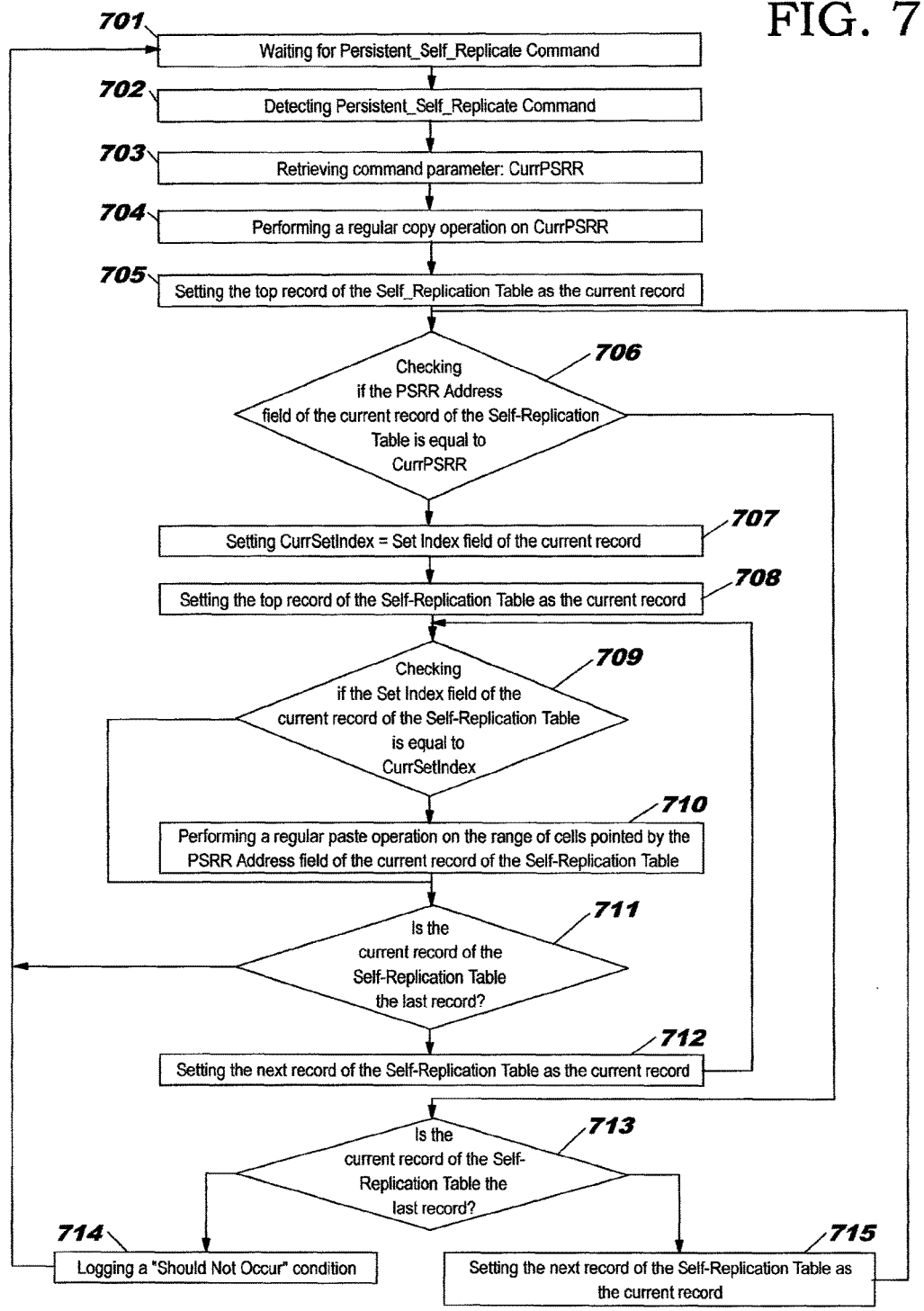
FIG. 7 is a flow chart illustrating a method for performing a persistent copy-paste operation, according to the present invention.

The method for automatically reflecting an update of the content of a PSRR onto the other PSRR belonging to the same PSRS to take advantage of the present invention is summarized in flowchart 700 of FIG. 7. This method may be thought of as the processing of the "Persistent_Self_Replicate" command which is invoked each time the content of a PSRR is changed, as outlined in the step 629 of the Self Replication_Manager method.

The method comprises the following steps:

At step 701, the method is in its default state, waiting for an event to initiate the process.

At step 702, an event is detected, as a result of a PSRR content update.

At step 703, the address of the updated PSRR, considered as a parameter of the Persistent_Self_Replicate command, is retrieved under the name CurrPSRR.

At step 704, a regular copy operation is performed on the PSRR with address CurrPSRR.

At step 705, the top record 410 of the Self-Replication Table 400 is set as the current record 401 of the table.

At step 706, the "PSRR Address" field 403 of the current record 401 of the Self-Replication Table 400 is compared against CurrPSRR. If found equal, then control is given to step 707; otherwise control is given to step 713.

At step 707, the local variable CurrSetIndex is set equal to the value of the "Set Index" field 405 of the current record 401 of the Self-Replication Table 400.

At step 708, the top record 410 of the Self-Replication Table 400 is set as the current record 401 of the table.

At step 709, the "Set Index" field 405 of the current record 401 of the Self-Replication Table 400 is compared against CurrSetIndex. If found equal, then control is given to step 710; otherwise control is given to step 711.

At step 710, a regular paste operation is performed on the range of cells pointed by the "PSRR Address" field 403 of the current record 401 of the Self-Replication Table 400.

At step 711, a test is performed to check if the current record 401 of the Persistent Copy-Paste Table 400 is in fact the last record of this table. If it is the last record, then control is given to the initial step 701 for handling any new future command; otherwise control is given to step 712.

At step 712, the next record of the Persistent Copy-Paste Table 400 is set as the new current record 401 of this table. Then control is given to step 709.

At step 713, a test is performed to check if the current record 401 of the Self-Replication Table 400 is in fact the last record of this table. If it is the last record, then control is given to step 714; otherwise control is given to step 715.

At step 714, a "Should Not Occur" condition is logged as it is normally impossible not to find in the Self-Replication table 400 a record 401 with a "PSRR Address" field 403 equal to the parameter CurrPSRR of the command. Then control is given to step 701 for handing any new future command.

At step 715, the next record of the Self-Replication Table 400 is set as the new current record 401 of this table. Then control is given to step 706.

ALTERNATE EMBODIMENTS

While the invention has been particularly shown and described with reference to one embodiment, it will be understood that various changes in form and detail may be made therein without departing from the spirit, and scope of the invention.

The Persistently Self-Replication method and system according to the present invention may be used advantageously in those environments where elements of information are organized as multidimensional tables having more than three dimensions.

What is claimed is:

1. A computer-implemented method for self-replicating ranges of cells in a spreadsheet, the method comprising executing on a central processor the steps of:
   presenting, within a graphical user interface, a plurality of unique set names that are each assigned to one each of a plurality of different sets of ranges of cells of a spreadsheet, wherein each of the unique set names are assigned to at least one of the ranges, and each of the ranges of cells comprise a plurality of different cells of the spreadsheet;

in response to a selection of one of the presented unique set names via an input to the graphical user interface, listing at least one range of the plurality of the ranges that is assigned to the selected unique set name; and in response to an update of one of the cells of the listed at least one range of the plurality of the ranges that is assigned to the selected unique set name via the graphical user interface, automatically entering the update into all other ones of the cells of the ranges that are assigned to the set of the selected unique set name by:

establishing a top record within a self replication table containing an address field of the unique set name, a pattern of the cells of the ranges assigned to the selected unique set name, and set and range indices of the cells of the ranges assigned to the selected unique set name;

setting the top record of the self replication table as the current record; and updating the all other ones of the cells of the ranges assigned to the selected unique set name set by retrieving the address field of the unique set name from the top record of the self replication table set as the current record and pasting the update entered by the user into the one of the cells into the all other ones of the cells of the ranges assigned to the selected unique set name that are pointed to by the retrieved address field.

2. The method of claim 1, further comprising:
integrating computer-readable program code into a computer system comprising the processor, a computer readable memory in circuit communication with the processor, and a computer readable storage medium in circuit communication with the processor; and
wherein the processor executes program code instructions stored on the computer-readable storage medium via the computer readable memory and thereby performs the steps of presenting within the graphical user interface the plurality of unique set names that are each assigned to one each of a plurality of different sets of ranges of cells of a spreadsheet, listing the at least one range of the plurality of the ranges that is assigned to the selected unique set name in response to the selection of one of the presented unique set names via an input to the graphical user interface, and, in response to the update of one of the cells of the listed at least one range of the plurality of the ranges that is assigned to the selected unique set name via the graphical user interface, automatically entering the update into all other ones of the cells of the ranges that are assigned to the set of the selected unique set name.

3. The method of claim 1, further comprising:
in response to selection of a suppress button that is displayed within the graphical user interface, deleting one of the ranges that is assigned to the selected set of ranges from the list of ranges.

4. The method of claim 1, further comprising:
in response to selection of an add button that is displayed within the graphical user interface, assigning another range that is identified in a range field to the selected set of ranges.

5. The method of claim 1, further comprising:
in response to selection of a rename button that is displayed within the graphical user interface, renaming the unique name of the selected set of ranges of cells with another unique name entered into a rename text box.

6. The method of claim 1, wherein each of the cells of the ranges assigned to the selected set have a same size.

7. The method of claim 1, further comprising:
defining a display attribute for a first variable;
associating the first variable with each of the cells of the ranges that are assigned to the selected set of ranges; and
displaying the cells of the selected set of ranges associated with the first variable with the defined display attribute.

8. A system, comprising:
a processor;
a computer readable memory in circuit communication with the processor; and
a computer-readable storage device in circuit communication with the processor;
wherein the processor executes program instructions stored on the computer-readable storage device via the computer readable memory and thereby:
presents, within a graphical user interface, a plurality of unique set names that are each assigned to one each of a plurality of different sets of ranges of cells of a spreadsheet, wherein each of the unique set names are assigned to at least one of the ranges, and each of the ranges of cells comprise a plurality of different cells of the spreadsheet;
in response to a selection of one of the presented unique set names via an input to the graphical user interface, lists at least one range of the plurality of the ranges that is assigned to the selected unique set name; and
in response to an update of one of the cells of the listed at least one range of the plurality of the ranges that is assigned to the selected unique set name via the graphical user interface, automatically enters the update into all other ones of the cells of the ranges that are assigned to the set of the selected unique set name by:
establishing a top record within a self replication table containing an address field of the unique set name, a pattern of the cells of the ranges assigned to the selected unique set name, and set and range indices of the cells of the ranges assigned to the selected unique set name;
setting the top record of the self replication table as the current record; and
updating the all other ones of the cells of the ranges assigned to the selected unique set name set by retrieving the address field of the unique set name from the top record of the self replication table set as the current record and pasting the update entered by the user into the one of the cells into the all other ones of the cells of the ranges assigned to the selected unique set name that are pointed to by the retrieved address field.

9. The system of claim 8, wherein the central processor executes the program instructions stored on the computer-readable storage device via the computer readable memory, and thereby:
in response to selection of a suppress button that is displayed within the graphical user interface, deletes one of the ranges that is assigned to the selected set of ranges from the list of ranges.

10. The system of claim 8, wherein the central processor executes the program instructions stored on the computer-readable storage device via the computer readable memory, and thereby:
in response to selection of an add button that is displayed within the graphical user interface, assigns another range that is identified in a range field to the selected set of ranges.

11. The system of claim 8, wherein the central processor executes the program instructions stored on the computer-readable storage device via the computer readable memory, and thereby:

in response to selection of a rename button that is displayed within the graphical user interface, renames the unique name of the selected set of ranges of cells with another unique name entered into a rename text box.

12. The system of claim 8, wherein each of the cells of the ranges assigned to the selected set have a same size.

13. The system of claim 8, wherein the central processor executes the program instructions stored on the computer-readable storage device via the computer readable memory, and thereby:

defines a display attribute for a first variable;

associates the first variable with each of the cells of the ranges that are assigned to the selected set of ranges; and displays the cells of the selected set of ranges associated with the first variable with the defined display attribute.

14. An article of manufacture, comprising:

a computer readable hardware storage device having computer readable program code embodied therewith, the computer readable program code comprising instructions for execution by a computer central processor that cause the computer central processor to:

present, within a graphical user interface, a plurality of unique set names that are each assigned to one each of a plurality of different sets of ranges of cells of a spreadsheet, wherein each of the unique set names are assigned to at least one of the ranges, and each of the ranges of cells comprise a plurality of different cells of the spreadsheet;

in response to a selection of one of the presented unique set names via an input to the graphical user interface, list at least one range of the plurality of the ranges that is assigned to the selected unique set name; and in response to an update of one of the cells of the listed at least one range of the plurality of the ranges that is assigned to the selected unique set name via the graphical user interface, automatically enter the update into all other ones of the cells of the ranges that are assigned to the set of the selected unique set name by:

establishing a top record within a self replication table containing an address field of the unique set name, a pattern of the cells of the ranges assigned to the selected unique set name, and set and range indices of the cells of the ranges assigned to the selected unique set name;

setting the top record of the self replication table as the current record; and updating the all other ones of the cells of the ranges assigned to the selected unique set name set by retrieving the address field of the unique set name from the top record of the self replication table set as the current record and pasting the update entered by the user into the one of the cells into the all other ones of the cells of the ranges assigned to the selected unique set name that are pointed to by the retrieved address field.

15. The article of manufacture of claim 14, wherein the computer readable program code instructions for execution by the computer central processor, further cause the computer central processor to:

in response to selection of a suppress button that is displayed within the graphical user interface, deletes one of the ranges that is assigned to the selected set of ranges from the list of ranges.

16. The article of manufacture of claim 14, wherein the computer readable program code instructions for execution by the computer central processor, further cause the computer central processor to:

in response to selection of an add button that is displayed within the graphical user interface, assign another range that is identified in a range field to the selected set of ranges.

17. The article of manufacture of claim 14, wherein the computer readable program code instructions for execution by the computer central processor, further cause the computer central processor to:

in response to selection of a rename button that is displayed within the graphical user interface, rename the unique name of the selected set of ranges of cells with another unique name entered into a rename text box.

18. The article of manufacture of claim 14, wherein each of the cells of the ranges assigned to the selected set have a same size.

19. The article of manufacture of claim 14, wherein the computer readable program code instructions for execution by the computer central processor, further cause the computer central processor to:

define a display attribute for a first variable;

associate the first variable with each of the cells of the ranges that are assigned to the selected set of ranges; and display the cells of the selected set of ranges associated with the first variable with the defined display attribute.

* * * * *